United States Patent Office 3,213,749
Patented Oct. 26, 1965

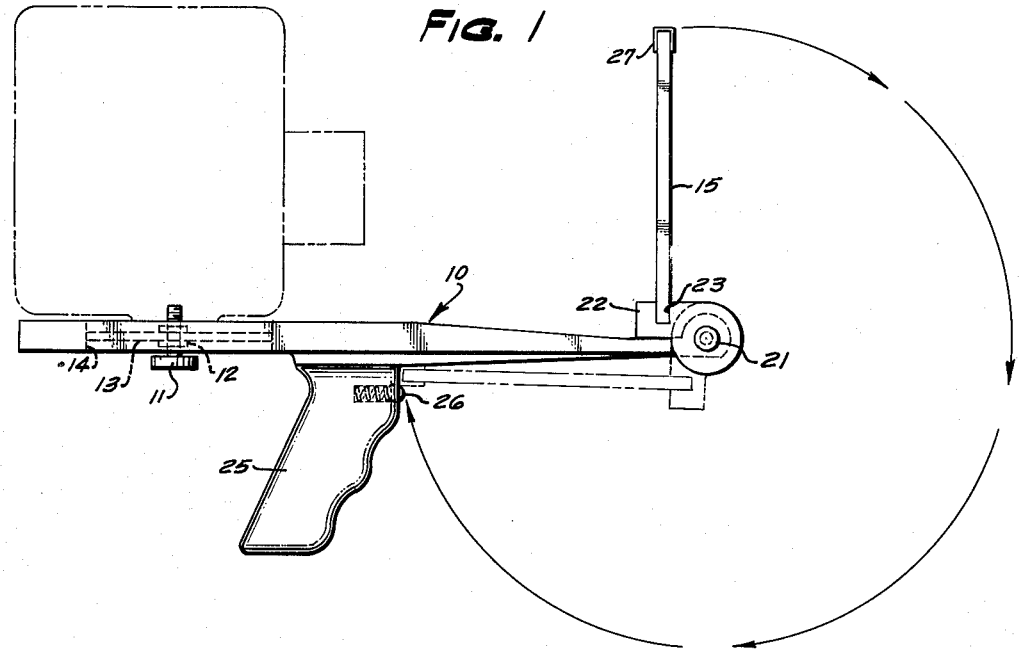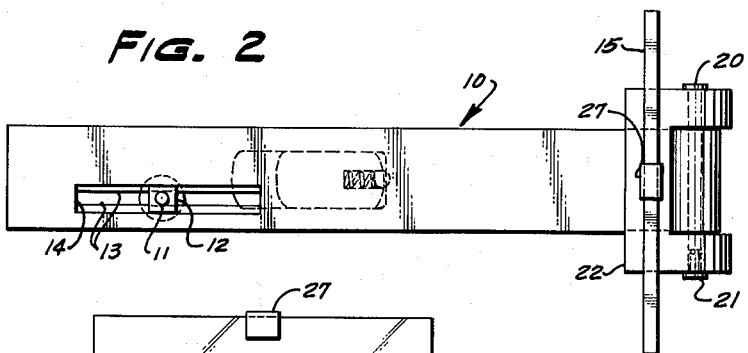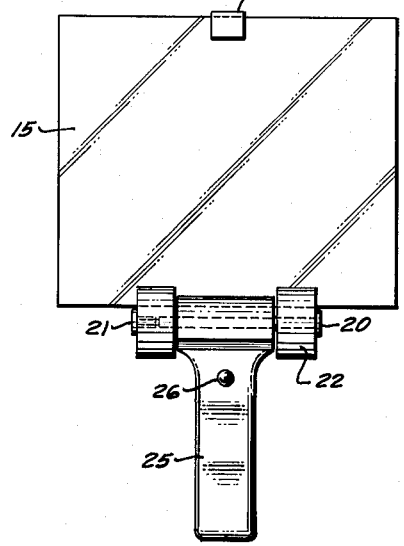

3,213,749
CAMERA TITLING DEVICE
Alfred F. Hanks, 9635 SW. Greenburg Road,
Tigard, Oreg.
Filed Aug. 1, 1962, Ser. No. 214,007
4 Claims. (Cl. 88—24)

The present invention comprises a camera titling device whereby titles may be photographed onto a film as a scene is being photographed, thereby preserving the identify of the scene. The device is particularly adapted for use in association with movie cameras but may be used with still cameras as well.

The principal object of the present invention is to provide a device of this character including a transparent title plate which may be positioned in the field of view of the camera and thereby cause the identity of the scene to be impressed upon the first few feet of a sequence of film, and which may be rapidly swung out of the way to an inoperative position without disturbing the sequence. In other words, the present invention permits the operator to impose the title of a sequence on the first portion of the sequence, then remove the title from the field of view of the camera without stopping the camera for that purpose.

A further object of the present invention is to provide a simplified movie titling device which will also aid the operator in steadying the camera during the shooting sequence.

A further object of the present invention is to provide a device of the foregoing character including a transparent titling plate upon which titles may be written by the use of crayon or the like, in which the titling plate is inoperatively retained in such position that it is possible to write the titles clearly and legibly.

The objects and advantages of the present invention will be more readily apparent from the following specification taken in connection with the accompanying drawings wherein like numerals refer to like parts throughout and in which a preferred form of the invention is disclosed.

In the drawings,
FIG. 1 is a side elevation of the device;
FIG. 2 is a plan view thereof; and
FIG. 3 is a front elevation thereof.

The titling device comprises an elongated camera mounting member 10 in the form of a board. The rear end of the mounting member comprises camera mounting means such as a knurled head screw 11 engaged in a nut 12 which is slidably supported by longitudinally extending tracks 13 mounted in an elongated slot 14. The construction is such that the screw 11 may be engaged with the usual threaded socket in the bottom of the camera which is provided for mounting the camera on a tripod or the like. When the screw is loosened the camera may be slid longitudinally of the mounting member so that it will properly focus upon a title imposed upon a transparent, glass or plastic title plate 15 mounted at the forward end of the mounting member.

A pivot 20 is transversely mounted at the forward end of the mounting member 10, the pivot preferably comprising a shaft having a head at one end, and a threaded socket at the other end in which is engaged a screw 21, so that the shaft may be removed if desired. A clevis shaped plate mounting member 22 is pivotally supported by the pivot 20 in such manner that it may extend rearwardly from the pivot, resting upon the upper surface of the camera mounting member 10, and may swing through an arc of substantially 270 degrees so as to project downwardly beneath the forward end of the mounting member 10. The plate holding device 22 is provided with a transverse slot 23 in the surface which is uppermost when the device is in operative position as illustrated in FIG. 1, in which slot the title plate 15 is fixed in any suitable manner. The plate 15 therefore may be positioned in the operative position in which it extends upwardly above the camera mounting member and across the field of view of the camera, so that titles written thereon will be imposed upon the film. When the plate is in this position it is retained by gravity alone, so that it may be readily swung forwardly and downwardly around the pivot 20 to an inoperative position extending rearwardly beneath the camera supporting member 10 in substantial parallelism therewith.

Depending from the intermediate portion of the camera mounting member 10 there is provided a pistol grip 25 which may be grasped in one hand so as to aid in steadying the camera and directing it toward the scene. The forward edge of the pistol grip is provided with a spring detent ball device 26 which is adapted to engage the edge of the plate 15 and retain it in the inoperative position. In order that the edge of the plate 15 may not be damaged it is preferably provided with a metal clip 27 which engages the detent ball 26.

When the title plate 15 is in its inoperative position it is a simple matter to turn the entire device upside down and point the forward end of the holder toward the operator, so that he may write a title on the exposed surface of the plate 15. The title will therefore be right side up and reading from left to right when the title plate is swung into its operative position.

Having illustrated and described a preferred embodiment of the invention, it should be apparent to those skilled in the art that the invention permits of modification in arrangement and detail. I claim as my invention all such modifications as come within the true spirit and scope of the following claims.

I claim:
1. In a titling device for a camera,
    an elongated member adapted to be carried with a camera,
    attachment means for attaching one end of the elongated member to the bottom of a camera in a position in which the elongated member extends forwardly and below the field of view of the camera,
    a pistol grip member for supporting the elongated member,
    a title plate,
    means mounting the title plate on the other end of the elongated member for pivotal movement between a first position in which the titling plate projects upwardly from the elongated member into the field of view of the camera forwardly to a second position below the field of view of the camera and in which the front face of the title plate is conveniently accessible to a user of the camera,
    and means mounted on the pistol grip member for detachably engaging the title plate to hold the title plate in said second position.
2. In a camera titling device for a camera,
    an elongated member adapted to be carried with a camera,
    means for attaching one end of the elongated member to the bottom of a camera in a position extending wholly below the field of view of the camera and forwardly away from the camera,
    a pistol grip member secured to the bottom of the elongated member for supporting the elongated member and a camera attached to the elongated member,
    a title plate,
    hinge means mounting the title plate on the forward end of the elongated member for supporting the title plate in a first position extending upwardly into the field of view of the camera and permitting movement of the title plate from the first position to a second position folded back on the bottom of the elongated member, and releasable latch means positioned adjacent the pistol grip member for holding the title plate in the second position.

3. A camera tilting device comprising an elongated camera mounting member including means for mounting a camera at one end, the other end of said mounting member projecting forwardly from the camera beneath its field of view, a plate holding device pivotally mounted at the forward end of said mounting member, a transparent plate mounted on said plate holding device for movement from an operative position projecting upwardly into the field of view of the camera to an inoperative position beneath said mounting member, a pistol grip depending from said mounting member, and means on said pistol grip for detachably engaging said title plate and holding it in said inoperative position.

4. The construction set forth in claim 3 wherein said title plate swings through an arc of approximately 270 degrees so as to extend parallel to said mounting member when in said inoperative position.

References Cited by the Examiner

UNITED STATES PATENTS

| 1,885,555 | 11/32 | Schwartz | 88—24 |
| 2,235,355 | 3/41 | Brown | 88—24 |
| 2,942,537 | 6/60 | Zimmerman | 95—1.1 |

FOREIGN PATENTS

| 956,155 | 7/49 | France. |
| 1,089,858 | 10/54 | France. |

NORTON ANSHER, *Primary Examiner.*

EMIL G. ANDERSON, *Examiner.*